Figure 1:
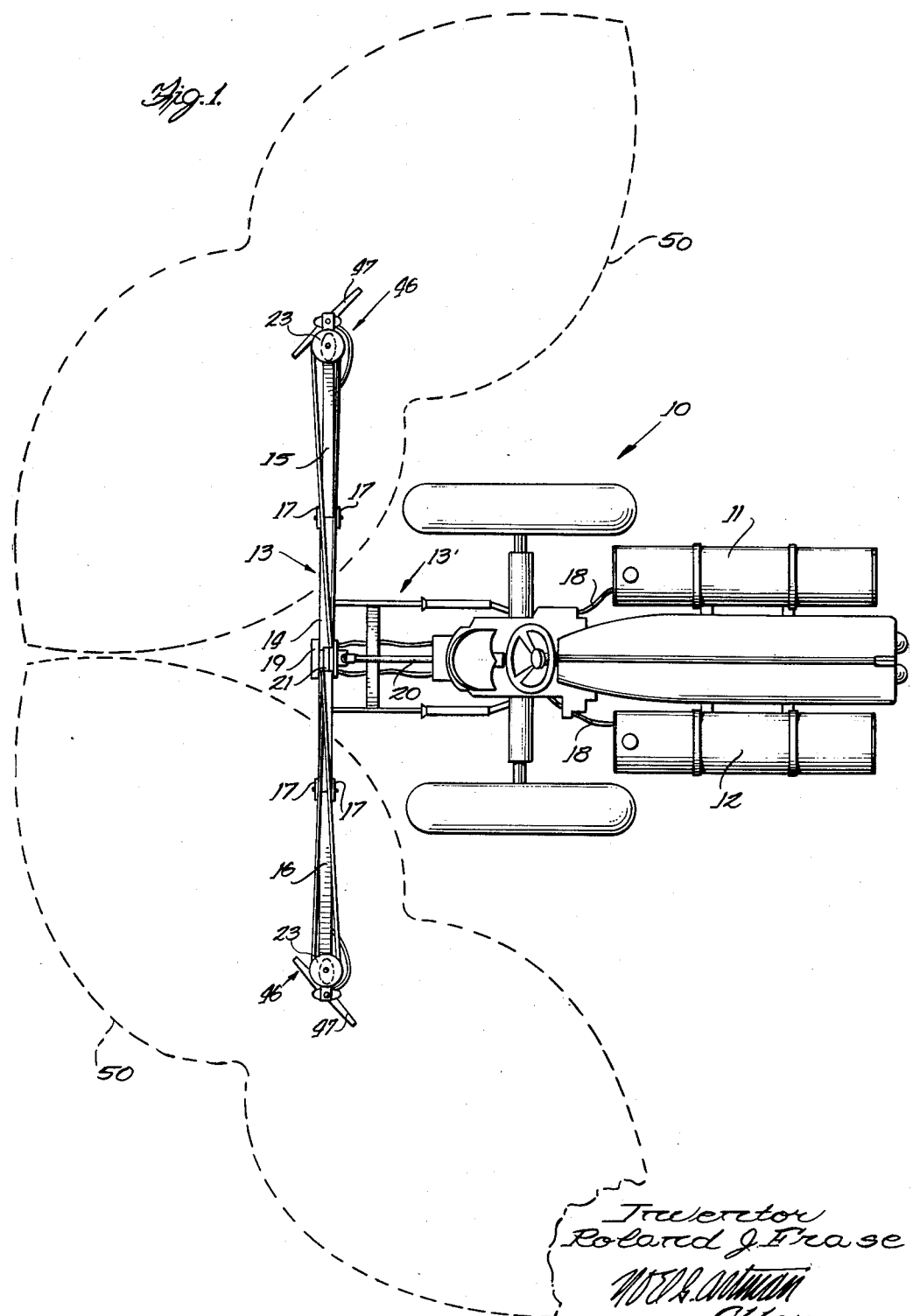

March 31, 1964    R. J. FRASE    3,127,109
MOBILE DUAL OVAL PATTERN FERTILIZER DISTRIBUTOR
Filed Jan. 2, 1963    2 Sheets-Sheet 1

Inventor
Roland J. Frase
Attorney

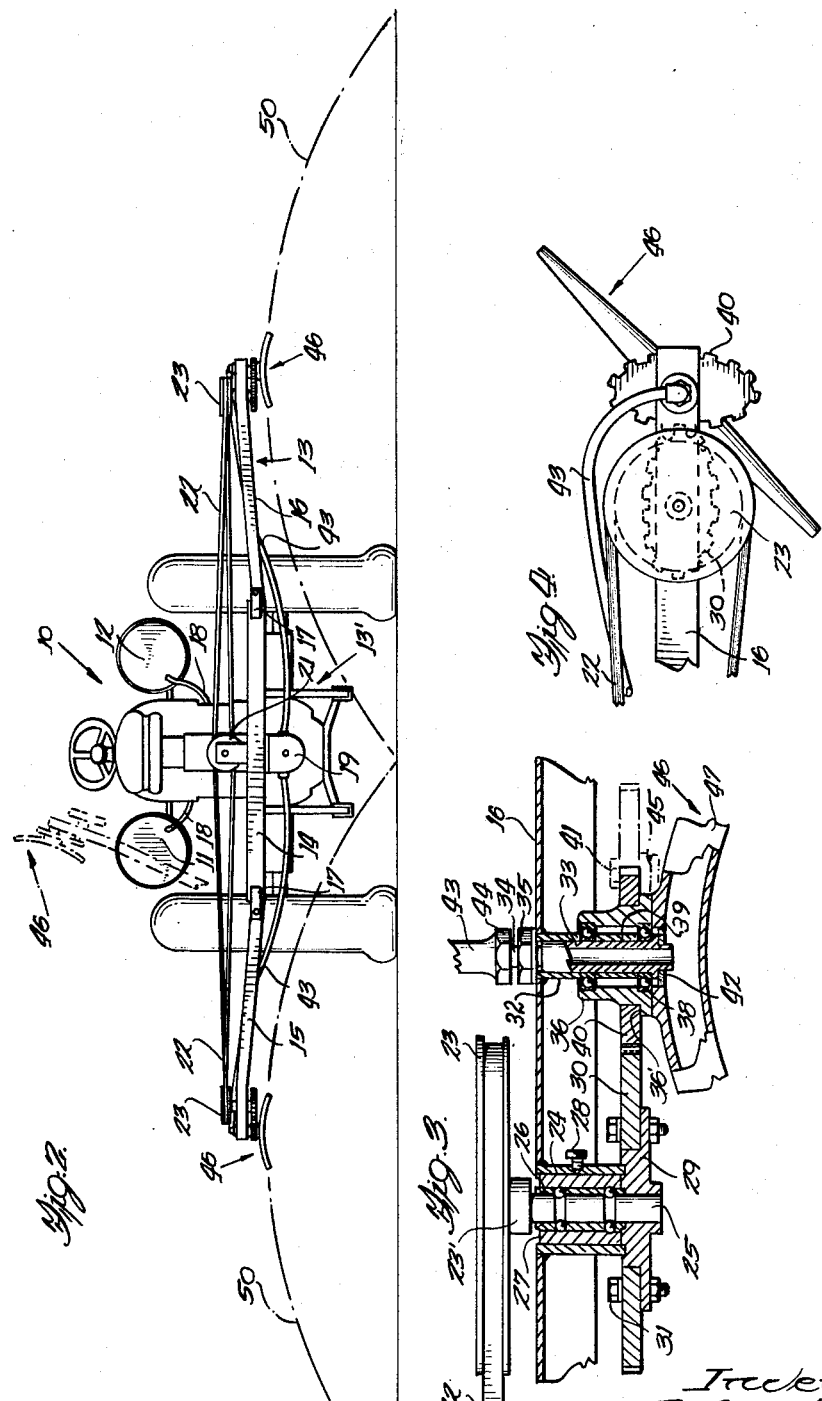

United States Patent Office  3,127,109
Patented Mar. 31, 1964

3,127,109
MOBILE DUAL OVAL PATTERN FERTILIZER
DISTRIBUTOR
Roland J. Frase, Palatine, Ill., assignor to International Harvester Company, Chicago, Ill., a corporation of New Jersey
Filed Jan. 2, 1963, Ser. No. 248,972
4 Claims. (Cl. 239—162)

This invention relates in general to material distributing devices, and more particularly to a new and improved machine of the tractor mounted type which is used to apply fluids, such as insecticides or fertilizers, to growing crops.

In the agricultural field in the past it has been well known to provide spraying devices, having a wheeled frame structure which is adapted to be pulled by a tractor or other source of motor power, with booms which extend laterally outwardly from the sides of the frame. Conventionally, a plurality of nozzles were provided at spaced-apart points along the booms, the nozzles being positioned so that the spray emitted from adjacent nozzles produced an overlapping spray pattern, whereby a substantially uniformly sprayed area is produced as the apparatus traverses a field. While such devices have functioned satisfactorily to achieve their desired purpose, they have proven to be undesirably expensive particularly in the provision of supporting wheels and a lengthy framework.

Accordingly, it is a principal object of the present invention to provide a spraying device which may be mounted upon the tractor hitch alone, thus eliminating the provision of supporting wheels and the associated mounting structure therefor.

Another object of the present invention is to provide a spraying device having a substantially reduced width, yet which is capable of spraying a large area which was heretofore only possible with wider machines.

Still another object of the invention is the provision of a spraying device which will produce a substantially uniformly sprayed area with a less number of nozzles than herebefore possible.

A further object of the invention is to provide a spraying device which can be mounted closely adjacent to the tractor wheels, yet which makes efficient use of the fluid by uniformly distributing it upon the crops without spraying the tractor.

Other objects and advantages of the invention will hereinafter become apparent from the following description of the annexed drawing, which illustrates a preferred embodiment of the invention, and wherein:

FIG. 1 is a plan view of the present invention mounted upon a tractor;
FIG. 2 is an end elevational view of the apparatus set forth in FIG. 1;
FIG. 3 is an end elevational sectional view on an enlarged scale of one of the fluid distributors of the present invention; and
FIG. 4 is a plan view of the structure set forth in FIG. 3.

Referring now to the drawings, wherein like reference characters designate like or corresponding parts, a tractor of conventional design is indicated in its entirety by reference numeral 10. In the illustrated embodiment, a pair of fluid storing tanks 11 and 12, are provided on opposite sides of tractor 10. It should be pointed out, however, that the location of the fluid storing tanks is not critical to the present invention, in that a tank may be secured behind the driver's seat, or in any other place where it may be conveniently accessible to the spraying apparatus.

The distributor device is provided with frame means indicated in its entirety by reference numeral 13, which is adapted to be connected to the tractor or source of motive power by suitable draft means such as shown at 13'. In the illustrated embodiment frame structure 13 consists of a central section 14 disposed behind the tractive vehicle, and a pair of outrigger members 15 and 16 pivotally secured to the central section 14 by pairs of pivot links 17—17. A pair of fluid conveying lines 18 communicate with tank members 11 and 12, and extend rearwardly to pump 19 which is centrally disposed upon section 14.

The novel structural features of the individual distributors of the present invention are set forth in detail in FIG. 3 and FIG. 4, and since each of the distributors is substantially identical, a description of one distributor is deemed sufficient to set forth the novel features contained therein. In the illustrated embodiment the distributors are rotated by a belt drive means deriving power from the power take-off 20 of the tractive vehicle, which rotates a dual grooved sheave 21 mounted upon center section 14. In FIG. 3 it will be noted that the belt 22 extends laterally outwardly from sheave 21 to drive pulley 23, which is rotatably mounted in channel shaped beam 16. In this respect a hollow cylindrically shaped sleeve 24 is fixedly mounted in a circular opening in the upper flange of beam 16. A generally vertically extending shaft 25 is rotatably mounted within sleeve 24 by a bearing whose inner race 26 is shrunk upon shaft 25, and whose outer race 27 is locked within sleeve 24 by at least one set screw 28. The upper end of shaft 25 extends above beam 16, and has fixedly mounted thereon the downwardly depending hollow sleeve 23' of pulley 23. An apertured flange 29 is fixedly secured to the lower end of shaft 25, and an elliptical gear 30 is mounted thereon by bolts 31 or the like.

A second hollow cylindrically shaped sleeve 32 is mounted in a circular opening in the upper flange of beam 16 at a point spaced laterally outwardly from sleeve 24. A hollow tubular member 33 is received within sleeve 32, said tubular member having a threaded end portion 34 extending above beam 16. A nut 35 cooperates with threaded end portion 34 to securely fix member 33 with respect to beam 16. A hub 36 is rotatably mounted upon member 33 by bearings 37 and 38, which are retained in their spaced-apart aligned relationship by a spacer 39. Hub 36 is provided with a generally elliptically shaped flange 36' to which an elliptical gear 40 is secured as by bolts 41 or the like. Gear 40 is positioned so as to meshingly engage gear 30 to constitute means for converting the uniform rotational motion imparted to gear 30 into rotary motion of periodically variable speed. An annular sealing member 42 is preferably provided adjacent the lower end portion of member 33 to protect bearing 38.

Flexible conduit members 43 extend laterally outwardly from pump 19 where they are fastened in communicating relation with portion 34 of member 33 by fitting 44. While distributors 46 may be formed integrally with hub 36, in the preferred and illustrated embodiment, distributor 46 has a substantially elliptically shaped shoulder 45 on its upper surface, the said shoulder having internally threaded holes, not shown, aligned with, and adapted to receive bolts 41. Distributor 46 is provided with two outwardly diverging nozzle portions 47 and 48, which are adapted to distribute the fluid in diametrically opposed directions.

It should therefore be apparent that the uniform rotary motion imparted to elliptical gear 30 by the belt drive means will be transmitted into rotary motion of periodically varying speed by the interaction of elliptical gear 40 with gear 30. This interaction will cause the distributor 46 to be accelerated to a maximum speed, at which the fluid will be thrown the farthest distance from distributor 46, and then to be decelerated to a minimum speed, at which the fluid will be thrown the least distance from distributor 46. It can be readily understood that the aforedescribed periodically variable speed of distributor 46 will produce a flow pattern resembling a figure 8 as fluid is emitted from nozzles 47 and 48, as can be best seen at 50 in FIG. 1. This arrangement enables a spraying device employing only a pair of distributors to spray an area which was heretofore possible only with a spraying device employing a substantially greater number of nozzles. Because of the shape of the spray pattern produced, the spraying device of the present invention may be mounted closely adjacent to the tractor, and in fact upon the tractor hitch itself, thus eliminating the supporting wheels and lengthy framework necessary for larger prior art devices.

The foregoing disclosure relates to only a preferred embodiment of the invention and numerous modifications or alterations may be made therein without departing from the spirit and the scope of the invention as set forth in the appended claims.

What is claimed is:

1. In a sprayer adapted for connection to the rear of a tractor having laterally spaced rear wheels, a transverse frame connected to the tractor rearwardly of said rear wheels, downwardly directed spray distributors mounted at laterally spaced locations on said frame adjacent said rear wheels, conduits mounted on said frame connected to said distributors for directing spray material thereto, drive transmission means carried by the frame and operatively connected to said distributors for simultaneously rotating them to discharge spray material received from said conduits in horizontal planes, and means in said drive transmission means for varying the rotational speed of said distributors during each revolution thereof to discharge the spray material from each of said distributors in substantially oval patterns.

2. The invention set forth in claim 1, wherein said spray heads are so disposed that the long axes of said spray patterns diverge in the direction of travel of the tractor.

3. The invention set forth in claim 1, wherein the pattern produced by each of said distributors is generally in the shape of a figure 8 with the short axis thereof adjacent one of said tractor wheels to thereby substantially avoid contact of spray material with said wheel.

4. The invention set forth in claim 1, wherein an elliptical gear is carried by each of said distributors and the drive transmission means on the frame includes an elliptical gear operatively engageable with the elliptical gear on the distributor to vary the rotational speed thereof.

References Cited in the file of this patent

UNITED STATES PATENTS

| | | |
|---|---|---|
| 1,592,452 | Ferns et al. | July 13, 1926 |
| 2,138,282 | Lanninger | Nov. 29, 1938 |
| 2,596,693 | Karlstrom | May 13, 1952 |
| 2,677,577 | Miller | May 4, 1954 |
| 2,897,765 | Kitano | Aug. 8, 1959 |

FOREIGN PATENTS

| | | |
|---|---|---|
| 993,091 | France | July 18, 1951 |